(12) United States Patent
Edlund

(10) Patent No.: US 7,201,783 B2
(45) Date of Patent: Apr. 10, 2007

(54) FUEL PROCESSING SYSTEM AND IMPROVED FEEDSTOCK THEREFOR

(75) Inventor: David J. Edlund, Bend, OR (US)

(73) Assignee: IdaTech, LLC, Bend, OR (US)

(*) Notice: Subject to any disclaimer, the term of this patent is extended or adjusted under 35 U.S.C. 154(b) by 569 days.

(21) Appl. No.: 10/016,807

(22) Filed: Nov. 1, 2001

(65) Prior Publication Data
US 2002/0083645 A1 Jul. 4, 2002

Related U.S. Application Data

(60) Provisional application No. 60/248,236, filed on Nov. 13, 2000.

(51) Int. Cl.
*C01B 3/32* (2006.01)
*B01D 53/22* (2006.01)
*C01B 3/50* (2006.01)

(52) U.S. Cl. .................. 48/127.7; 48/214 A; 422/190; 429/19; 429/17

(58) Field of Classification Search ............... 48/127.7, 48/214 A; 422/190; 429/19, 17; 96/4, 9, 96/11; 95/55
See application file for complete search history.

(56) References Cited

U.S. PATENT DOCUMENTS

| | | | |
|---|---|---|---|
| 3,336,730 A | 8/1967 | McBride et al. | |
| 3,350,176 A | 10/1967 | Green et al. | |
| 3,409,421 A | 11/1968 | Belo et al. | |
| 3,469,944 A | 9/1969 | Bocard et al. | |
| 4,098,959 A | 7/1978 | Fanciullo | |
| 4,445,909 A | 5/1984 | Burns | |
| 5,302,470 A | 4/1994 | Okada et al. | |
| 5,401,589 A | 3/1995 | Palmer et al. | |
| 5,432,710 A | 7/1995 | Ishimaru et al. | |
| 5,637,414 A | 6/1997 | Inoue et al. | |
| 5,861,137 A | 1/1999 | Edlund | |

(Continued)

FOREIGN PATENT DOCUMENTS

GB  2 283 235  * 3/1995

OTHER PUBLICATIONS

English-language abstract of Japanese Patent Publication No. JP 10203801, 1998.

(Continued)

*Primary Examiner*—N. Bhat
(74) *Attorney, Agent, or Firm*—Kolisch Hartwell, P.C.

(57) ABSTRACT

An improved feedstock for fuel processing systems, and fuel processing systems incorporating the same. The fuel processing system includes a fuel processor adapted to produce a product hydrogen stream from a carbon-containing feedstock. The fuel processing system may also include a fuel cell stack adapted to produce an electric current from the product hydrogen stream. The feedstock is at least substantially formed of a hydrocarbon or alcohol. In an exemplary embodiment, the feedstock includes methanol. The feedstock also includes at least one odorant adapted to produce a strong and characteristic odor, even when present in only low concentrations. The odorant, or odorants, are selected to be free or at least sufficiently free from compounds that will poison the catalyst used in the fuel processor.

60 Claims, 1 Drawing Sheet

U.S. PATENT DOCUMENTS

| | | |
|---|---|---|
| 5,932,181 A | 8/1999 | Kim et al. |
| 5,997,594 A | 12/1999 | Edlund et al. |
| 6,083,637 A | 7/2000 | Walz et al. |
| 6,152,995 A | 11/2000 | Edlund |
| 6,221,117 B1 | 4/2001 | Edlund et al. |
| 6,319,306 B1 * | 11/2001 | Edlund et al. .................... 96/7 |
| 6,494,937 B1 * | 12/2002 | Edlund et al. .................... 96/4 |
| 6,572,837 B1 * | 6/2003 | Holland et al. .......... 423/648.1 |
| 2003/0215374 A1 * | 11/2003 | Wheeldon et al. .......... 422/198 |

OTHER PUBLICATIONS

English-language abstract of Japanese Patent Publication No. JP 08060167, 1996.

English-language abstract of Japanese Patent Publication No. JP 04173895, 1992.

* cited by examiner

US 7,201,783 B2

FUEL PROCESSING SYSTEM AND IMPROVED FEEDSTOCK THEREFOR

RELATED APPLICATION

This application claims priority to U.S. Provisional Patent Application Ser. No. 60/248,236, which was filed on Nov. 13, 2000 now abandoned, is entitled "Fuel Processing System and Improved Feedstock Therefor," and the complete disclosure of which is hereby incorporated by reference for all purposes.

FIELD OF THE INVENTION

The present invention relates generally to fuel processing systems, and more particularly to an improved feedstock for fuel processing systems and fuel processing systems utilizing this feedstock.

BACKGROUND AND SUMMARY OF THE INVENTION

A fuel processing system includes a fuel processor that produces hydrogen gas from a carbon-containing feedstock. Examples of suitable fuel processors include steam reformers and autothermal reformers that utilize a reforming catalyst to produce hydrogen gas from the carbon-containing feedstock and water. The system may, but does not necessarily, include a fuel cell stack that produces an electrical current from the hydrogen gas produced by the fuel processor.

Examples of suitable carbon-containing feedstocks include hydrocarbons and alcohols. Methanol is an ideal feedstock for use in a fuel processing system, especially when the hydrogen gas produced in the fuel processor is delivered to a low-temperature fuel-cell stack, such as fuel cell stacks that include proton-exchange membrane (PEM) fuel cells or alkaline fuel cells.

However, methanol also poses health hazards because it is a toxic alcohol (by inhalation of vapors, contact with the liquid, and ingestion of the liquid). Methanol also has very little odor. Because of this, it is difficult to smell methanol if it is spilled or leaks from a storage device, fuel processor, transport conduit, or the like. Therefore, there is a need for a suitable method for detecting methanol that leaks, spills, or is otherwise unintentionally released. Conventional odorants used with natural gas are not suitable for use in fuel processing systems because these odorants are alkyl thiols that poison the reforming catalyst, thereby destroying the utility of the fuel processor.

SUMMARY OF THE INVENTION

The present invention is directed to an improved feedstock for fuel processing systems, and fuel processing systems incorporating the same. The fuel processing system includes a fuel processor adapted to produce a product hydrogen stream from a carbon-containing feedstock. The fuel processing system may also include a fuel cell stack adapted to produce an electric current from the product hydrogen stream. The feedstock is at least substantially formed of a hydrocarbon or alcohol. In an exemplary embodiment, the feedstock includes methanol. The feedstock also includes at least one odorant adapted to produce a strong and characteristic odor, even when present in only low concentrations. The odorant, or odorants, are selected to be free or at least sufficiently free from compounds that will poison the catalyst used in the fuel processor.

DETAILED DESCRIPTION AND BEST MODE OF THE INVENTION

Figure 1:
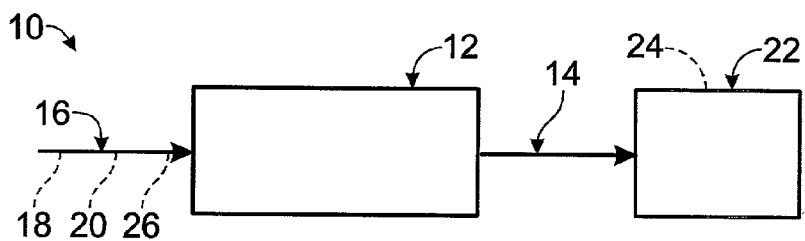
FIG. 1 is a schematic diagram of a fuel processing system according to the present invention.

A fuel processing system according to the present invention is shown in FIG. 1 and generally indicated at 10. System 10 includes at least one fuel processor 12 that is adapted to produce a product hydrogen stream 14 containing hydrogen gas from a feed stream 16 containing a carbon-containing feedstock 18. Feed stream 16 may be delivered to fuel processor 12 via any suitable mechanism. Feedstock 18 includes at least one hydrocarbon or alcohol. Examples of suitable hydrocarbons include methane, propane, natural gas, diesel, kerosene, gasoline and the like. Examples of suitable alcohols include methanol, ethanol, and polyols such as ethylene glycol and propylene glycol.

Fuel processor 12 may produce hydrogen gas from carbon-containing feedstock 18 through any suitable mechanism. Examples of suitable mechanisms include steam reforming and autothermal reforming, in which reforming catalysts are used to produce hydrogen gas from carbon-containing feedstock 18 and water 20. Another suitable mechanism for producing hydrogen gas is catalytic partial oxidation of an alcohol or hydrocarbon.

Figure 2:
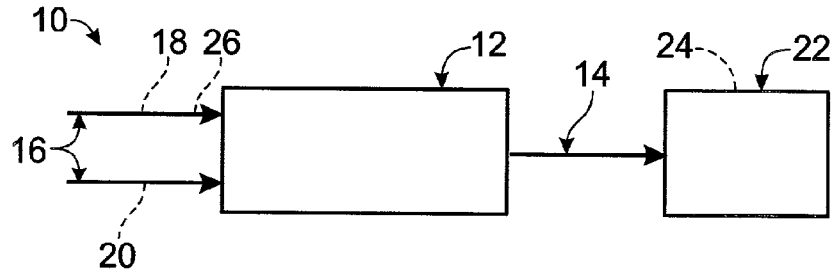
FIG. 2 is a schematic diagram of another fuel processing system according to the present invention.

Although only a single feed stream 16 is shown in FIG. 1, it should be understood that more than one stream 16 may be used and that these streams may contain the same or different components. When carbon-containing feedstock 18 is miscible with water, the feedstock is typically delivered with the water component of feed stream 16, such as shown in FIG. 1. When the carbon-containing feedstock is immiscible or only slightly miscible with water, these components are typically delivered to fuel processor 12 in separate streams such as shown in FIG. 2.

Fuel processing system 10 may, but does not necessarily, further include at least one fuel cell stack 22. Fuel cell stack 22 contains at least one, and typically multiple, fuel cells 24 adapted to produce an electric current from the portion of the product hydrogen stream delivered thereto. Examples of suitable fuel cells include proton exchange membrane (PEM) fuel cells and alkaline fuel cells. Some or all of stream 14 may additionally, or alternatively, be delivered, via a suitable conduit, for use in another hydrogen-consuming process, burned for fuel/heat, or stored for later use. Examples of suitable storage mechanisms include pressurized tanks and hydride beds.

As discussed above, carbon-containing feedstock 18 may be any suitable hydrocarbon or alcohol. When fuel processing system 10 includes a fuel cell stack, a preferred feedstock is methanol, and more particularly, fuel-cell grade methanol. Generally, catalysts that are used for conducting the water-gas shift reaction are suitable for steam reforming methanol. Commonly used (and commercially available) methanol steam-reforming catalysts consist of mixtures of copper and zinc oxide, and copper and chromium oxide. These catalyst formulations are very rapidly and completely poisoned by compounds of sulfur, compounds of phosphorous, volatile heavy metals (e.g., cadmium, mercury), and compounds of heavy metals. Therefore, the methanol is preferably free from these compounds so that the reforming catalyst is not poisoned. Similarly, other carbon-containing feedstocks should be sufficiently free from these or other compounds that will poison the reforming or other catalysts used to produce hydrogen gas therefrom.

Because methanol is toxic, it poses a health hazard if ingested or inhaled. Because methanol is generally odorless, it is not readily identified or noticed if spilled or unintentionally discharged from the fuel processing system. Therefore, carbon-containing feedstock 18 preferably includes one or more odorants 26.

The odorant should be volatile and should be completely, or sufficiently, free of compounds that will impair the operation of fuel processing system 10, such as compounds that will poison the catalyst used in fuel processor 12. For example, odorants used with reforming catalysts should include only trace, and preferably are free of, sulfur, phosphorous and heavy metals. By "volatile," it is meant that the odorant has a boiling point of less than approximately 300° C. Typically, but not necessarily, these compounds will also have a low molecular weight. By "low molecular weight," it is meant that these compounds have a molecular weight less than approximately 1000. Odorant 26 should be partially, or completely, miscible with methanol or the other carbon-containing feedstock with which the odorant is used.

Odorant 26 should produce a strong and detectable odor, even when the odorant is present in low concentrations. Preferably, the odorant produces a characteristic odor. Even more preferably, the odorant produces a distasteful odor. By "characteristic odor," it is meant that the odor is readily detectable in the environment surrounding the fuel processing system by not being an odor commonly present in such an environment. Therefore, even when odorant 26 is used with a carbon-containing feedstock that itself has an odor, the characteristic smell of the odorant will be detectable. By "distasteful," it is meant that the odor smells rotten, such as smelling like rotting eggs, fish, flesh, etc. This is particularly useful when the carbon-containing feedstock is toxic or otherwise hazardous if ingested because the distasteful smell of the odorant will disincline ingestion of the carbon-containing feedstock/odorant mixture, even if the individual does not know that the mixture is toxic or otherwise hazardous.

Any suitable odorant meeting the criteria set forth herein may be used. Examples of suitable odorants 26 include organic amines with at least one amine functional group. The following table lists several candidate organic amines and their melting and boiling points.

TABLE 1

Physical Properties of Organic Amines

| Odorant | Melting Point (° C.) | Boiling Point (° C.) |
| --- | --- | --- |
| Trimethylamine | −117 | 3–4 |
| Triethylamine | −115 | 88.8 |
| Tripropylamine | −93.5 | 155–158 |
| n-Butylamine | −50.5 | 77.9 |
| n-Pentlyamine | −50 | 104 |
| n-Hexylamine | −23 | 131–132 |
| n-Heptylamine | −23 | 154–156 |
| n-Octylamine | −5 | 175–177 |

TABLE 1-continued

Physical Properties of Organic Amines

| Odorant | Melting Point (° C.) | Boiling Point (° C.) |
| --- | --- | --- |
| n-Decylamine | 12–14 | 216–218 |
| 1,3-Diaminopropane | −12 | 140 |
| 1,4-Diaminobutane | 27–28 | 158–160 |
| 1,5-Diaminopentane | 9 | 178–180 |
| 1,7-Diaminoheptane | 27–29 | 147–149 |

All of these odorants have a characteristically unpleasant odor that is detectable at very low concentrations. For instance, trimethylamine has a characteristic "rotten fish" odor that is easily smelled when trimethylamine is dissolved in methanol/water mixtures at a concentration of 10 ppm (parts per million by volume). Trimethylamine is available as a 40% solution in water from Aldrich Chemical Co. of Milwaukee, Wis.

Experiments using trimethylamine doped methanol/water solution (10 ppm trimethylamine added to a methanol/water mixture containing 67 vol % methanol and 33 vol % water) have shown that the activity of a commercial copper/zinc oxide reforming catalyst (G66B, sold by Süd-Chemie of Louisville, Ky.) is unaffected by the trimethylamine.

Although these volatile organic amines are effective odorants, they also offer an additional advantage of deterring human consumption due to their distasteful smell. In particular, trimethylamine smells like rotten fish, whereas 1,4-diaminobutane and 1,5-diaminopentane have smells characterisitic of rotten flesh (hence their trivial names of putrescine and cadaverine, respectively).

Figure 3:
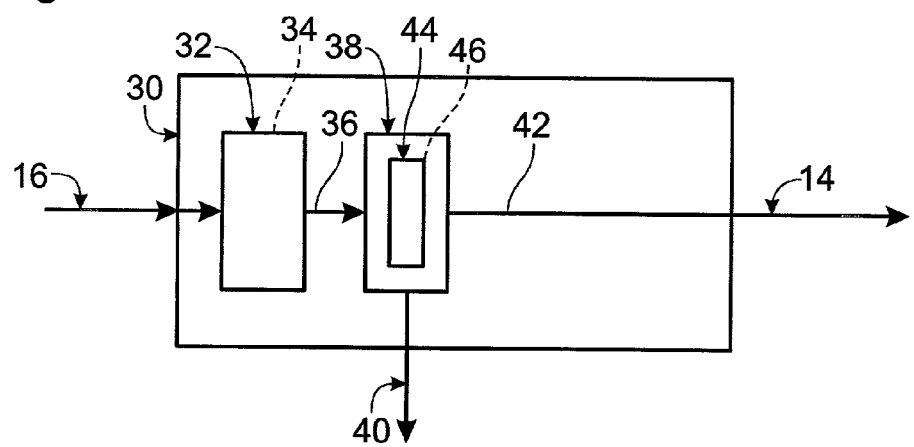
FIG. 3 is a schematic diagram of a fuel processor suitable for use in the system of FIG. 1.

As discussed, an example of a suitable fuel processor 12 is a steam reformer. An example of a suitable steam reformer is shown in FIG. 3 and indicated generally at 30. Reformer 30 includes a reforming, or hydrogen-producing, region 32 that includes a steam reforming catalyst 34. Alternatively, reformer 30 may be an autothermal reformer that includes an autothermal reforming catalyst. In region 32, a hydrogen-containing stream 36 is produced from the water and carbon-containing feedstock forming feed stream(s) 16. The hydrogen-containing stream typically contains impurities, and therefore is delivered to a separation region, or purification region, 38, where the stream is purified. In separation region 38, the hydrogen-containing stream is separated into one or more byproduct streams 40 and a hydrogen-rich stream 42 by any suitable pressure-driven separation process. In FIG. 3, hydrogen-rich stream 42 is shown forming product hydrogen stream 14.

An example of a suitable structure for use in separation region 38 is a membrane module 44, which contains one or more hydrogen permeable metal membranes 46. An example of a suitable membrane module formed from a plurality of hydrogen-selective metal membranes is disclosed in U.S. Pat. No. 6,221,117, which was filed on Apr. 13, 1999 as U.S. patent application Ser. No. 09/291,447, is entitled "Fuel Processing System," and the complete disclosure of which is hereby incorporated by reference. In that application, a plurality of generally planar membranes are assembled together into a membrane module having flow channels through which an impure gas stream is delivered to the membranes, a purified gas stream is harvested from the membranes and a byproduct stream is removed from the membranes. Gaskets, such as flexible graphite gaskets, are used to achieve seals around the feed and permeate flow channels. Other examples are disclosed in U.S. patent application Ser. No. 09/812,499, which was filed on Mar. 19, 2001, is entitled "Hydrogen-Selective Metal Membrane Modules and Method of Forming the Same", and the complete disclosure of which is hereby incorporated by reference; and in U.S. patent application Ser. No. 09/967,172, which was filed on Sept. 27, 2001, is entitled "Hydrogen Purification Devices, Components and Fuel Processing Systems Containing The Same", and the complete disclosure of which is hereby incorporated by reference. Other suitable fuel processors are also disclosed in the incorporated patent applications.

The thin, planar, hydrogen-permeable membranes are preferably composed of palladium alloys, most especially palladium with 35 wt % to 45 wt % copper. These membranes are typically formed from a thin foil that is approximately 0.001 inches thick. It is within the scope of the present invention, however, that the membranes may be formed from hydrogen-selective metals and metal alloys other than those discussed above, hydrogen-permeable and selective ceramics, or carbon compositions. The membranes may have thicknesses that are larger or smaller than discussed above. For example, the membrane may be made thinner, with commensurate increase in hydrogen flux. The hydrogen-permeable membranes may be arranged in any suitable configuration, such as arranged in pairs around a common permeate channel as is disclosed in the incorporated patent application. The hydrogen permeable membrane or membranes may take other configurations as well, such as tubular configurations.

Another example of a suitable pressure-separation process is pressure swing absorption (PSA). Therefore, region 38 may alternatively include suitable structure for performing pressure swing absorption.

Figure 4:
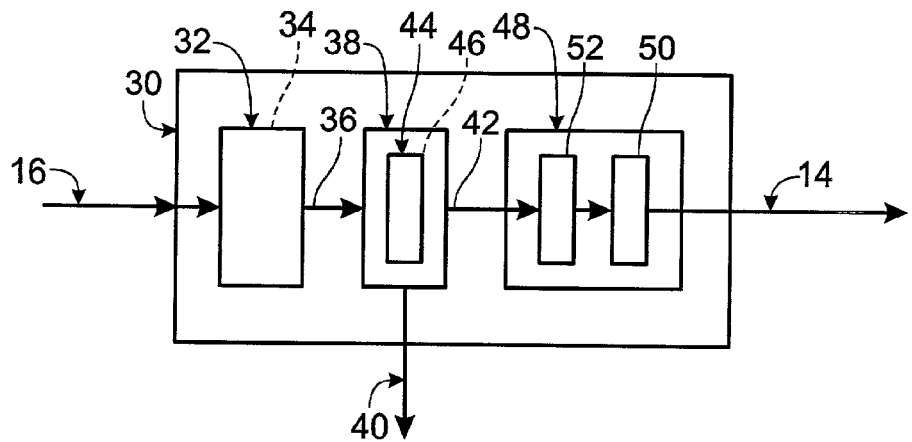
FIG. 4 is a schematic diagram of another fuel processor suitable for use in the system of FIG. 1.

Reformer 30 may, but does not necessarily, further include a polishing region 48, such as shown in FIG. 4. Polishing region 48 receives hydrogen-rich stream 42 from separation region 38 and further purifies the stream by reducing the concentration of, or removing, selected compositions therein. For example, when fuel processing system 10 includes a fuel cell stack, or when product hydrogen stream 14 is intended for use in a fuel cell stack, compositions that may damage the fuel cell stack, such as carbon monoxide and carbon dioxide, may be removed from the hydrogen-rich stream. Region 48 includes any suitable structure for removing or reducing the concentration of the selected compositions in stream 42. For example, when the product stream is intended for use in a PEM fuel cell stack or other device that will be damaged if the stream contains more than determined concentrations of carbon monoxide or carbon dioxide, it may be desirable to include at least one methanation catalyst bed 50. Bed 50 converts carbon monoxide and carbon dioxide into methane and water, both of which will not damage a PEM fuel cell stack. Polishing region 48 may also include another hydrogen-producing device 52, such as another reforming catalyst bed, to convert any unreacted feedstock into hydrogen gas. In such an embodiment, it is preferable that the second reforming catalyst bed is upstream from the methanation catalyst bed so as not to reintroduce carbon dioxide or carbon monoxide downstream of the methanation catalyst bed.

INDUSTRIAL APPLICABILITY

The present invention is applicable in any fuel processing system in which hydrogen gas is produced from a carbon-containing feedstock. The invention is particularly useful when the carbon-containing feedstock is methanol, although it may be used with other hydrocarbons and alcohols.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. A fuel processing system, comprising:
    a feedstock supply containing at least a carbon-containing feedstock, water and an odorant, wherein the odorant has a different composition than the carbon-containing feedstock, imparts to the carbon-containing feedstock an odor distinct from the carbon-containing feedstock, and is at least substantially free from sulfur compounds;
    a fuel processor adapted to produce a product hydrogen stream containing hydrogen gas from a feed stream from the feedstock supply;
    at least one reforming catalyst bed within the fuel processor and adapted to produce a mixed gas stream containing hydrogen gas and other gases from the feed stream; and
    a separation region within the fuel processor and adapted to receive the mixed gas stream and to separate the mixed gas stream into a hydrogen-rich stream containing at least substantially hydrogen gas and a byproduct stream containing at least a substantial portion of the other gases, and further wherein the product hydrogen stream is formed from the hydrogen-rich stream.

2. The fuel processing system of claim 1, wherein the odorant is adapted to have a distasteful odor.

3. The fuel processing system of claim 1, wherein the odorant is volatile.

4. The fuel processing system of claim 1, wherein the odorant is at least substantially miscible in the carbon-containing feedstock.

5. The fuel processing system of claim 4, wherein the odorant is completely miscible in the carbon-containing feedstock.

6. The fuel processing system of claim 1, wherein the odorant has a boiling point of less than approximately 300° C.

7. The fuel processing system of claim 6, wherein the odorant has a boiling point of less than 200° C.

8. The fuel processing system of claim 1, wherein the odorant has a molecular weight of less than 1000.

9. The fuel processing system of claim 1, wherein the odorant is at least substantially free of phosphorous and heavy metals.

10. The fuel processing system of claim 9, wherein the odorant is free of sulfur.

11. The fuel processing system of claim 9, wherein the odorant is free of phosphorous.

12. The fuel processing system of claim 9, wherein the odorant is free of heavy metals.

13. The fuel processing system of claim 1, wherein the odorant is adapted to have a strong and readily detectable odor even when present in concentrations of approximately 10 ppm.

14. The fuel processing system of claim 1, wherein the odorant includes at least one organic amine having at least one amine functional group.

15. The fuel processing system of claim 14, wherein the odorant includes an organic amine selected from the group consisting of trimethylamine, triethylamine, tripropylamine, n-butylamine, n-pentylamine, n-hexylamine, n-heptylamine, n-octylamine, and n-decylamine.

16. The fuel processing system of claim 1, wherein the odorant includes at least one organic amine having at least two amine functional groups.

17. The fuel processing system of claim 16, wherein the at least one organic amine is selected from the group consisting of 1,3-diaminopropane, 1,4-diaminobutane, 1,5-diaminopentane, and 1,7-diaminoheptane.

18. The fuel processing system of claim 1, wherein the carbon-containing feedstock includes at least one hydrocarbon or alcohol.

19. The fuel processing system of claim 18, wherein the carbon-containing feedstock includes methanol.

20. The fuel processing system of claim 1, wherein the separation region is adapted to produce the hydrogen-rich stream and the byproduct stream by a pressure-driven separation process.

21. The fuel processing system of claim 20, wherein the separation region includes at least one hydrogen-permeable membrane, and further wherein the hydrogen-rich stream is formed from a portion of the mixed gas stream that passes through the membrane and the byproduct stream is formed from a portion of the mixed gas stream that does not pass through the membrane.

22. The fuel processing system of claim 21, wherein the separation region includes a plurality of hydrogen-permeable membranes.

23. The fuel processing system of claim 21, wherein the hydrogen-permeable membrane comprises at least one of palladium and a palladium alloy.

24. The fuel processing system of claim 23, wherein the hydrogen-permeable membrane comprises a palladium-copper alloy.

25. In a fuel processing system containing a feedstock supply comprising a carbon-containing feedstock that is a liquid at 25 degrees Celsius and 1 atmosphere pressure, and a fuel processor adapted to produce a product hydrogen stream comprising hydrogen gas from a feed stream from the feedstock supply, the improvement comprising: the feedstock supply further comprising an odorant comprising an organic amine having at least one amine functional group and a strong and detectable odor distinct from the carbon-containing feedstock.

26. The fuel processing system of claim 25, wherein the odorant is adapted to have a distasteful odor.

27. The fuel processing system of claim 25, wherein the odorant is volatile.

28. The fuel processing system of claim 25, wherein the odorant is at least substantially miscible with the carbon-containing feedstock.

29. The fuel processing system of claim 28, wherein the odorant is completely miscible with the carbon-containing feedstock.

30. The fuel processing system of claim 25, wherein the odorant has a boiling point of less than approximately 300° C.

31. The fuel processing system of claim 30, wherein the odorant has a boiling point of less than 200° C.

32. The fuel processing system of claim 25, wherein the odorant has a molecular weight of less than 1000.

33. The fuel processing system of claim 25, wherein the odorant is at least substantially free of sulfur, phosphorous, and heavy metals.

34. The fuel processing system of claim 33, wherein the odorant is free of sulfur.

35. The fuel processing system of claim 33, wherein the odorant is free of phosphorous.

36. The fuel processing system of claim 33, wherein the odorant is free of heavy metals.

37. The fuel processing system of claim 25, wherein the odorant is adapted to have a strong and readily detectable odor even when present in concentrations of approximately 10 ppm.

38. The fuel processing system of claim 25, wherein the odorant includes an organic amine selected from the group consisting of trimethylamine, triethylamine, tripropylamine, n-butylamine, n-pentylamine, n-hexylamine, n-heptylamine, n-octylamine, and n-decylamine.

39. The fuel processing system of claim 25, wherein the odorant includes at least one organic amine having at least two amine functional groups.

40. The fuel processing system of claim 39, wherein the at least one organic amine is selected from the group consisting of 1,3-diaminopropane, 1,4-diaminobutane, 1,5-diaminopentane, and 1,7-diaminoheptane.

41. The fuel processing system of claim 25, wherein the carbon-containing feedstock includes at least one hydrocarbon or alcohol.

42. The fuel processing system of claim 25, wherein the fuel processor is adapted to produce the product hydrogen stream via catalytic partial oxidation of the feed stream.

43. The fuel processing system of claim 25, wherein the feed stream further includes water.

44. The fuel processing system of claim 43, wherein the fuel processor includes at least one reforming region containing a reforming catalyst and adapted to produce a reformate stream from the feed stream.

45. The fuel processing system of claim 44, wherein the reforming catalyst is a steam reforming catalyst and the fuel processor is adapted to produce the reformate stream by steam reforming.

46. The fuel processing system of claim 44, wherein the reforming catalyst is an autothermal reformer and the fuel processor is adapted to produce the reformate stream by autothermal reforming.

47. The fuel processing system of claim 25, wherein the fuel processor includes a hydrogen-producing region that is adapted to receive the feed stream and to produce a mixed gas stream containing hydrogen gas and other gases therefrom, and further wherein the fuel processor further includes a separation region in which the mixed gas stream is separated into a hydrogen-rich stream containing at least substantially hydrogen gas and a byproduct stream containing at least a substantial portion of the other gases.

48. The fuel processing system of claim 47, wherein the separation region includes at least one hydrogen-permeable membrane, and further wherein the hydrogen-rich stream is formed from a portion of the mixed gas stream that passes through the membrane and the byproduct stream is formed from a portion of the mixed gas stream that does not pass through the membrane.

49. The fuel processing system of claim 48, wherein the separation region includes a plurality of hydrogen-permeable membranes.

50. The fuel processing system of claim 48, wherein the hydrogen-permeable membrane comprises at least one of palladium and a palladium alloy.

51. The fuel processing system of claim 50, wherein the hydrogen-permeable membrane comprises a palladium-copper alloy.

52. The fuel processing system of claim 47, wherein the product hydrogen stream is formed from the hydrogen-rich stream.

53. The fuel processing system of claim 25, wherein the carbon-containing feedstock includes at least one alcohol.

54. The fuel processing system of claim 53, wherein the carbon-containing feedstock includes methanol.

55. A fuel processing system, comprising:
a feedstock supply comprising:
water,
a carbon-containing feedstock comprising a hydrocarbon or an alcohol, the carbon-containing feedstock being colorless and liquid at 25 degrees Celsius and 1 atmosphere pressure; and
an organic amine additive having at least one amine functional group and a boiling point less than approximately 300 degrees Celsius for imparting a characteristic odor distinct from the carbon-containing feedstock;
a fuel processor adapted to produce a product hydrogen stream containing hydrogen gas from a feed stream from the feedstock supply;
at least one reforming catalyst bed within the fuel processor adapted to produce a mixed gas stream containing hydrogen gas and other gases from the feed stream; and
a separation region within the fuel processor and adapted to receive the mixed gas stream and to separate the mixed gas stream into a hydrogen-rich stream containing at least substantially hydrogen gas and a byproduct stream containing at least a substantial portion of the other gases, and further wherein the product hydrogen stream is formed from the hydrogen-rich stream.

56. The fuel processing system of claim 55, wherein the organic amine additive is substantially free of sulfur, phosphorous, and heavy metal compounds such that the organic amine additive is adapted to not poison the at least one reforming catalyst bed within the fuel processor.

57. The fuel processing system of claim 55, wherein the organic amine additive is selected from the group consisting of trimethylamine, triethylamine, tripropylamine, n-butylamine, n-pentylamine, n-hexylamine, n-heptylamine, n-octylamine, n-decylamine, 1,3-diaminopropane, 1,4-diaminobutane, 1,5-diaminopentane, and 1,7-diaminoheptane.

58. The fuel processing system of claim 57, wherein the feed stream includes a second additive distinct from, and in addition to, the organic amine additive, and further wherein the second additive is selected from the group consisting of trimethylamine, triethylamine, tripropylamine, n-butylamine, n-pentylamine, n-hexylamine, n-heptylamine, n-octylamine, n-decylamine, 1,3-diaminopropane, 1,4-diaminobutane, 1,5-diaminopentane, and 1,7-diaminoheptane.

59. The fuel processing system of claim 55, wherein the carbon-containing feedstock consists essentially of at least one alcohol.

60. The fuel processing system of claim 59, wherein the carbon-containing feedstock consists essentially of methanol.

* * * * *